Dec. 1, 1953     A. DAILEY     2,661,187
CONDUIT PULLING WINCH
Filed Jan. 17, 1952    2 Sheets-Sheet 1
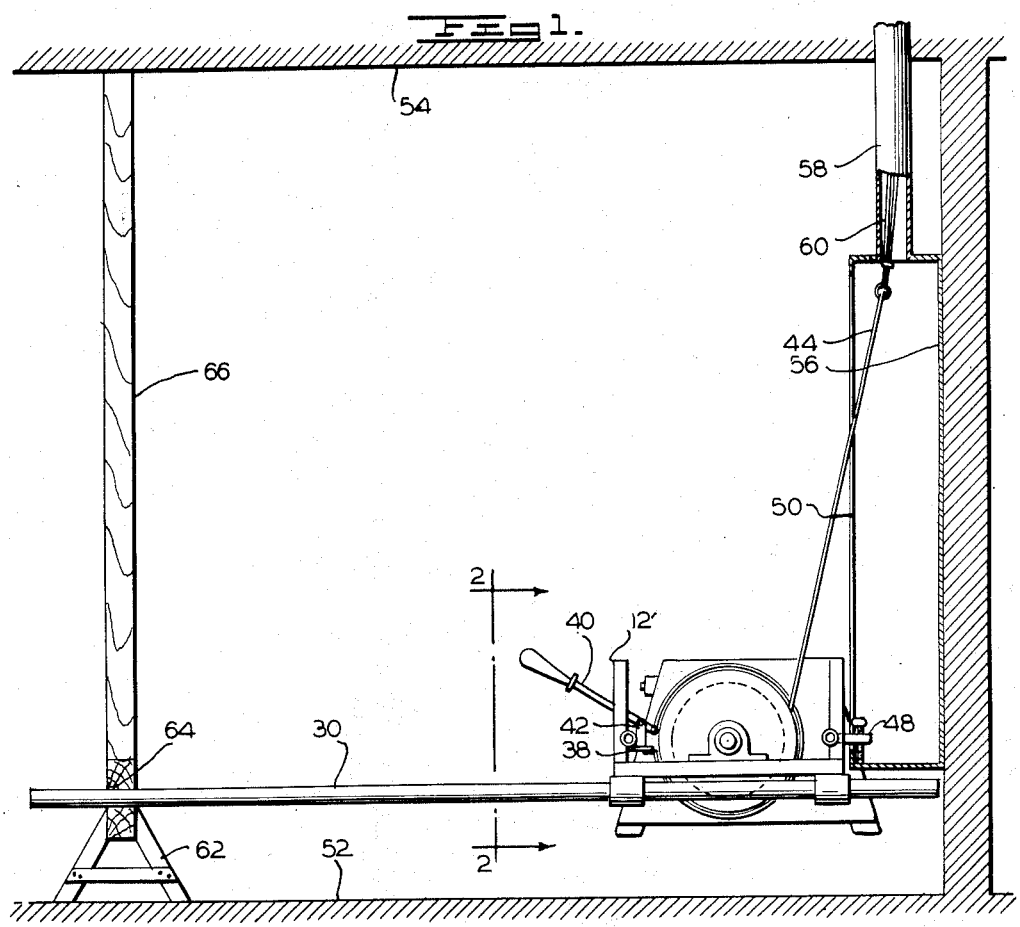
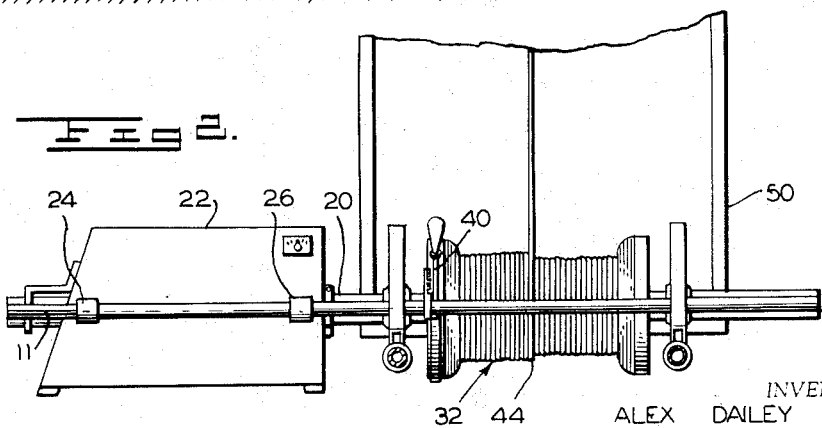
INVENTOR
ALEX DAILEY
BY *Cushman, Darby & Cushman*
ATTORNEYS Dec. 1, 1953
A. DAILEY
2,661,187
CONDUIT PULLING WINCH
Filed Jan. 17, 1952
2 Sheets-Sheet 2
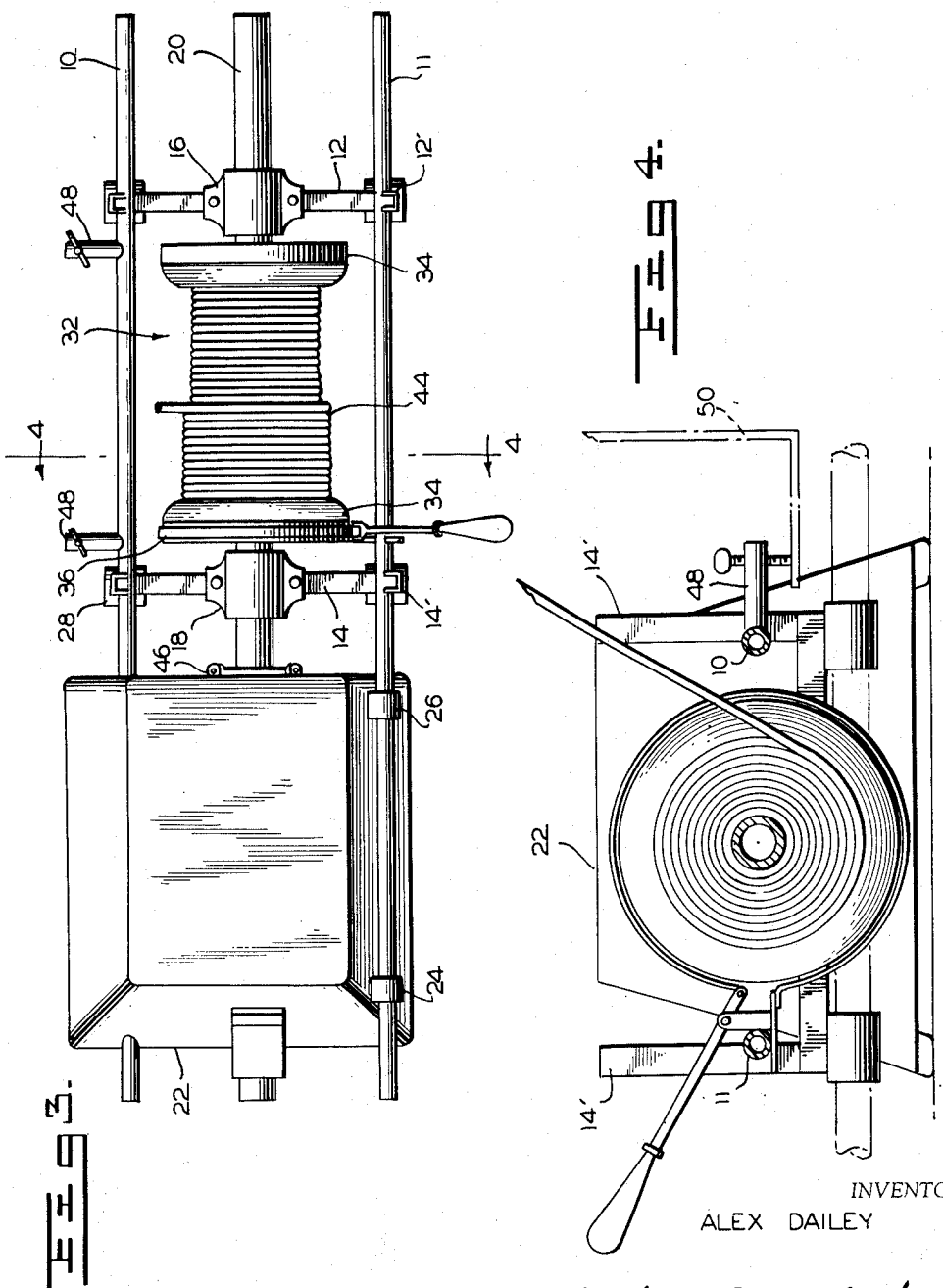
INVENTOR
ALEX DAILEY
BY Cushman, Darby & Cushman
ATTORNEYS Patented Dec. 1, 1953

2,661,187

UNITED STATES PATENT OFFICE 2,661,187

CONDUIT PULLING WINCH

Alex Dailey, Durham, N. C.

Application January 17, 1952, Serial No. 266,894

6 Claims. (Cl. 254—134.3)

The present invention relates to apparatus for use in connection with electrical, plumbing, heating and air conditioning installations.

More particularly, the present invention is concerned with the provision of improved apparatus for pulling electrical conductors or cables through conduits or similar pipes used in building construction work.

It is the common practice to pull electrical conductors through their associated conduits by hand, which is a tedious, time and man power consuming operation. It is, therefore, the principal object of the present invention to provide apparatus whereby a multiplicity of such conductors can be threaded in their respective conduits in a simple and efficient manner with the use of a single operator.

In the drawings:

Figure 1 is a side elevation of the apparatus of the present invention in position for pulling electrical conductors through a conduit;

Figure 2 is a sectional view taken substantially along the line 2—2 of Figure 1;

Figure 3 is a top plan view of the improved apparatus of the present invention; and Figure 4 is a cross sectional view taken substantially along the line 4—4 of Figure 3.

Referring in detail to the drawings, the apparatus of the invention is comprised of a pair of supporting frame members 10 and 11 which may be conveniently made up of sections of one inch pipe. A pair of cross channel members 12 and 14 are mounted transversely of the frame members 10 and 11 and are secured by welding. Cross members 12 and 14 are upturned at their free ends at right angles as seen in Figures 1 and 3 to form the portions 12' and 14', respectively. The frame members 10 and 11 are welded to the upstanding portions 12' and 14' of the cross members.

Mounted on each of the cross members 12 and 14, are a pair of bearings 16 and 18 having the shaft 20 disposed therein. Shaft 20 may be constructed from a two inch section of pipe, or may be cut from solid steel shaft stock.

A small portable electrically driven power vise 22 is detachably mounted to the frames 10 and 11 by means of collars 24 and 26 on one side of the vise with the other frame member 10 being received in an opening extending through the power vise housing in the manner shown in Figure 3. Power vise 22 is of conventional construction and may be purchased on the market.

Welded beneath the frames 10 and 11 at the point of attachment of cross members 12 and 14 are two pairs of collars 28 which may conveniently have an inner diameter of two inches to receive a pair of elongated supporting members 30 which extend through the collars 28 beneath the apparatus at right angles to the frame members 10 and 11.

Mounted on shaft 20 between the bearing members 16 and 18 is a reel 32 which is composed of the two end bell members 34, which are secured to the shaft 20. A hand operated brake is provided in order to control the quick stopping of the reel in operation. The brake mechanism is made up of a brake shoe 36 associated with the outer periphery of one of the bell members 34 of the reel 32. Brake shoe 36 is secured to the frame member 11 at one end, as seen at 38 in Figure 1, and is pivotally secured at its other end to the handle 40 which is, in turn, pivoted to the bracket 42 integral with the other end of the shoe 36. The desired size steel cable or rope 44 can be wound on the winch 34 by fastening the starting end of the cable through a hole in one of the end bells with a Crosby clamp.

Power vise 22 is provided with an adjustable chuck 46 to receive the shaft 20 so that the shaft 20 and winch 32 may be rotated.

A pair of clamps 48 are provided on the frame member 10 so that the apparatus may be clamped to the base portion of an electric panel box 50, a section of which is shown in Figures 1 and 4.

The manner of using the improved apparatus of the present invention is as essentially shown in Figure 1 where the apparatus is shown in position for pulling electrical conductors through a conduit, with reference numeral 52 indicating the floor and 54 the ceiling of a room having a side wall 56 against which the panel box 50 is mounted. While a plurality of conduits ordinarily lead into large panel boxes of this nature, only one such conduit 58 is shown in this view, which is partially broken away to show the individual conducting wires 60, which are to be pulled into the panel box 50 for connection to suitable switches and fuses. The supporting members 30 are of considerable length and will rest at their free ends on a sawhorse or buck 62 which, in turn, rests on the floor 52. In order to prevent the supporting members 30 from swinging upwardly under the pull of the winch 32, a 4 x 4 member, 64, or other such heavy timber is placed transversely across the free ends of the supporting members 30 and an upright 4 x 4 timber 66 is placed between the ceiling 54 and the cross 4 x 4 member 64 to prevent displacement of the apparatus while in use. The supporting elements just described are conventional and are to be found at practically all construction jobs wherein the present invention would be employed.

The other end of the supporting members 30 are held up by the clamps 48 attached to frame member 10 and the panel box 50 which is being serviced. Cable 44 is then pulled through the individual conduits and the electrical conductor attached, after which the power vise will be actuated to pull in the cable 44 and the attached conducting wires 60. It will be observed that a plurality of electrical conductors can be pulled simultaneously by means of this apparatus which requires but one attendant.

While the present invention has been described in connection with its use in pulling electrical conductors through their conduits, it is to be understood that the novel features of the present invention may be efficiently employed by plumbing, heating and air conditioning contractors, as well as in connection with any construction job where it may be effectively utilized.

The utility and acceptability of the present invention to the trade is accentuated by the fact that the apparatus is of light weight, inexpensive construction and may be mounted and demounted with the aid of one or two workmen. The power vise 22 may be removed from the frame members 10 and 11 and transported separately from the rest of the apparatus.

I claim:

1. Portable, knock-down apparatus for pulling electrical conductors through conduits comprising: a frame; a cable winch; a cable secured to said winch; a prime mover detachably secured to said frame, and said prime mover being detachably operatively connected to said winch; clamping means integrally secured to one side of said frame for detachably securing said apparatus to the open front of an electric panel box, wherein said cable on said winch may be fed into said box for engagement with an electrical conductor to be drawn through a conduit by said winch and cable; and lever means detachably secured to said frame opposite said clamping means whereby the operator may use said lever means to apply compensating torque opposite to that of said winch when an electrical conductor is being drawn through a conduit by said winch.

2. The apparatus of claim 1, said clamping means being so adapted that the bottom of said electric panel box is held between said clamps and said frame.

3. Portable, knock-down apparatus for pulling electrical conductors through conduits comprising: a pair of parallel horizontally disposed frame members; a pair of spaced U-shaped structural members, the closed ends of said U-shaped members extending transversely beneath said parallel frame members, wherein said frame members pass within and are integrally secured to the upstanding portions of said U-shaped members; a shaft intermediate and parallel to said frame members; bearings secured to the transverse portions of said U-shaped members and aligned to receive and journal said shaft; a winch detachably mounted on said shaft; a prime mover detachably carried on said frame and detachably operatively connected to said shaft; a plurality of clamps secured to one of said frame members adapted to detachably secure said apparatus to the open front of an electric panel box, wherein a cable on said winch may be fed into said box for engagement with an electrical conductor to be drawn through a conduit by said winch and cable; and lever means detachably secured to the other of said frame members whereby the operator may use said lever means to apply compensating torque opposite to that of said winch when an electrical conductor is being drawn through a conduit by said winch.

4. The apparatus of claim 3, said upstanding portions of said U-shaped members projecting upwardly beyond the outer periphery of said winch, whereby said upstanding portions serve as legs to support said winch when said winch is stored in an inverted position.

5. The apparatus of claim 3, said lever means comprising: pairs of sleeve members integrally secured in transverse alignment to the closed portion of said U-shaped members; and a pair of elongated rigid rods adapted to be detachably received within said sleeve members.

6. The apparatus of claim 5, said clamping means being so adapted that the bottom of said electric panel box is held between said clamps and portions of said lever rods slidably extending beneath said panel box.

ALEX DAILEY.

References Cited in the file of this patent

UNITED STATES PATENTS

| Number | Name | Date |
|---|---|---|
| 1,192,322 | Jenkins | July 25, 1916 |
| 2,239,822 | Larsen et al. | Apr. 29, 1941 |
| 2,526,092 | Snyder | Oct. 17, 1950 |